United States Patent Office 3,124,613
Patented Mar. 10, 1964

3,124,613
PRODUCTION OF OXIMES
Herbert L. Wehrmeister, Terre Haute, Ind., assignor to Commercial Solvents Corporation, a corporation of Maryland
No Drawing. Filed Jan. 16, 1959, Ser. No. 787,101
16 Claims. (Cl. 260—566)

My invention relates to an improved process for the production of oximes. More particularly, it relates to a method of producing oximes by oxime exchange between a carbonyl compound an an oxime.

Various methods have been suggested in the past for the production of carbonyl oximes, designated as ketoximes if made from a ketone and aldoximes if made from an aldehyde. One of the objects of my invention is to provide a simple and economical method for the production of higher oximes from lower readily available oximes.

The lower oximes have commonly been prepared by reaction of hydroxylamine with an aldehyde or a ketone, this reaction occurring with varying ease according to the nature of the carbonyl compound being reacted and the pH of the reaction meduim. Aldehydes usually react more readily than ketones and the aliphatic ketones react more readily than the aromatic ketones. Most favorable results are ordinarily obtained within a fairly narrow pH range. Higher pH ranges increase the rate of reaction but are undesirable because of instability of hydroxylamine in such media. Low pH's are undesirable because oximes under hydrolysis under such conditions. While the lower aldoximes and ketoximes are obtainable without too much difficulty in the above manner, the higher oximes are obtainable by this method only with considerable more difficulty, if at all, and at substantially greater expense. My new and improved process permits the production of higher oximes, and in particular, cycloaliphatic oximes, in a more economic manner than previously available.

My process consists essentially of effecting an oxime exchange between a lower readily available oxime and a carbonyl compound the oxime of which it is desired to produce, the oxime exchange being effected by the aid of cheap, readily available catalysts.

The carbonyl compounds useful as reactants in my process can be saturated aldehydes or ketones. If the carbonyl compound is a ketone, at least one of the carbon atom alphas to the carbonyl group must be unsubstituted. I prefer to utilize ketones where both the alpha and beta carbon atoms are unsubstituted on one side of the carbonly group, especially wher the substituents have large radicals which tend to sterically hinder the reaction. The remaining alpha carbon may be part of a ring structure, substituted or unsubstituted as desired.

Selection of the proper reactants enables me to produce a wide range of oximes by my new process. In order to accomplish the desired oxime exchange, it is necessary to select the two reactants so that the ketone or aldehyde formed during the exchange can be readily removed from the reaction zone so as to permit the reaction to proceed substantially to completion. This result is most effectively accomplished by selecting the two reactants so that the resulting ketone or aldehyde is readily and effectively removed from the reaction medium as rapidly as formed, by simple or azeotropic distillation. The exchange taking place, for example, between acetoxime and cyclohexanone produces cyclohexanone oxime and acetone. The latter, being much more volatile than either of the reactants or the cyclohexanone oxime, is readily removed by distillation as rapidly as it is formed and thus permits the reaction to go substantially to completion with the formation of high yields of cyclohexanone oxime.

Examples of carbonyl oximes which can be produced by my improved process include: methyl ethyl ketoxime, dipropyl ketoxime, cyclohexanone oxime, acetophenone oxime, hexanaldoxime, butyraldoxime, acetoveratrone oxime, 2-aceto-p-cymene oxime, p-chloroacetophenone oxime, 3-menthone oxime, pinacolone oxime, 2,4-pentane diketoxime, 2,5-hexane diketoxime, m-nitroacetophenone oxime, o,p-dimethylacetophenone oxime, 1,4-cyclohexane diketoxime, cyclopentanone oxime, anisaldoxime, 4-acetoxy-3-methoxybenzaldoxime, 2,4-dihydroxybenzaldoxime, p-dimethylaminobenzaldoxime, p-nitrobenzaldoxime, cumaldoxime, hexadecaldoxime, etc.

In producing carbonyl oximes by my new process, I react in the presence of a suitable acidic catalyst a ketoxime such as, for example, acetoxime, methyl ethyl ketoxime, methyl propyl ketoxime, methyl butyl ketoxime, methyl aryl ketoxime, or ethyl butyl ketoxime, or an aldoxime such as formaldoxime, acetaldoxime, butyraldoxime, or hexanaldoxime with a suitable carbonyl compound such as acetone, diethyl ketone, dipropyl ketone, methyl ethyl ketone, methyl propyl ketone, methyl aryl ketone, ethyl butyl ketone, cyclopropanone, cyclohexanone, acetophenone, butyraldehyde, hexanal, and the like. In carrying out the reaction it is necessary to select combinations of a carbonyl compound and an oxime which upon oxime exchange gives a different carbonyl compound having a boiling point below that of the carbonyl compound used as the reactant.

In carrying out my process, I have found that the oxime exchange is preferably effected in the presence of acidic catalysts. Catalysts which I have found suitable for this purpose include: inorganic mineral acids such as sulphuric, hydrochloric and phosphoric acids, organic carboxylic and sulphonic acids, such as formic, benzenesulphonic, p-toluenesulfonic, naphthalenesulphonic acids, inorganic and organic salts such as sodium bisulphate, primary ammonium phosphate, calcium chloride, zinc chloride, aluminum chloride, ammonium chloride, ammonium bromide, hydroxylammonium chloride, and boron trifluoride-ether complex. Usually from 0.01 to 10% by weight of the acidic catalyst gives satisfactory results.

My process can also be carried out in the presence of solvents, for example, lower aliphatic alcohols such as methanol, ethanol, butanol, etc.; hydrocarbons such as hexane, octane, benzene, xylene, etc.; ethers such as dioxane; halogenated hydrocarbons, etc.

The process of my invention is carried out by heating the mixture of oxime, carbonyl compound and catalyst and preferably removing from the reaction zone as rapidly as formed the resulting carbonyl compound. This is preferably accomplished by refluxing the reaction mixture until no more of the carbonyl compound formed by the reaction distills from the reaction mixture. It is evident, therefore, that the temperature used in carrying out my process will vary through a fairly wide range, depending upon the particular reactants used. I also prefer to add the carbonyl compound to the mixture of oxime and catalyst. This is especially true where the carbonyl reactant is an aldehyde because considerably increased yields are obtained and the amount of unwanted by products is reduced.

The operation of my process is illustrated by the following specific examples. It should be understood, however, that it is not limited to the particular reactants, catalysts, or reaction conditions shown therein but is operative as set forth above.

*Example I*

A mixture of 36.5 g. (0.5 mole) of acetoxime, and 60 g. of cyclohexanone (0.6 mole) was heated under reflux in the presence of 1 ml. of concentrated hydrochloric acid. Acetone was removed by distillation at a vapor temperature of 55–60° C. The removal of acetone was rather slow. Heating under reflux with intermittent removal of acetone was continued to a pot temperature of 150–170° C. and the residue thus obtained was distilled at reduced pressure. The product consisted of: cyclohexanone oxime 41.5 g., acetone 25.8 g., intermediate cut consisting primarily of cyclohexanone 15.0 g.

*Example II*

A series of experiments was carried out exactly as described in Example I using different types of acid catalysts. The results of the experiments are shown in Table I below:

| Ex. No. | Acet-oxime, g. | Cyclo-hexa-none, g. | Additive | Products | | |
|---|---|---|---|---|---|---|
| | | | | Ace-tone | Inter-med-iate Cut, g. | Cyclo-hexa-none Oxime, g. |
| 1354 | 36.5 | 60 | p-toluenesulfonic acid (1.0 g.) | 23.0 | 12.9 | 39.0 |
| 1356 | 36.5 | 60 | p-toluenesulfonic acid (0.2 g.) | 23.0 | 17.0 | 42.7 |
| 1357 | 36.5 | 60 | $H_2SO_4$ (5 drops) | 6.7 | 63.6 | 11.8 |
| 1358 | 36.5 | 60 | $CaCl_2$ (1 g.) | 23.7 | 17.6 | 39.6 |
| 1360 | 36.5 | 60 | $H_3PO_4$ (1 ml.) | 19.1 | 33.0 | 35.0 |
| 1361 | 36.5 | 60 | $ZnCl_2$ (1.3 g.) | 22.1 | 12.5 | 41.1 |
| 1363 | 36.5 | 60 | $BF_3Et_2O$ (5 ml.) | 22.7 | 13.0 | 32.0 |
| 1366 | 35.5 | 60 | $NH_4Cl$ (1 g.) | 26.3 | 10.0 | 44.4 |
| 1367 | 36.5 | 60 | $NH_4H_2PO_4$ (1 g.) | 10.6 | 53.5 | 18.2 |
| 1371 | 36.5 | 60 | $NH_4Br$ (1 g.) | 25.0 | 9.4 | 38.1 |
| 1397A | [1] 36.5 | 49 | $(NH_3OH)$ Cl (1 g.) | 20.7 | 8.0 | 34.3 |
| 1379B | [1] 36.5 | 74 | $(NH_3OH)$ (Cl (1 g.) | 22.6 | 26.6 | 33.7 |
| 1379C | [1] 36.5 | 98 | $(NH_3OH)$ (Cl 1 g.) | 24.9 | 47.7 | 38.0 |

[1] Impure acetoxime was used.

*Example III*

A mixture of 36.5 g. of acetoxime, 43 g. of methyl ethyl ketone and 1 g. of p-toluenesulfonic acid was heated under a 20″ column packed with glass helices and fitted with a distillation head. Acetone was removed intermittently at a vapor temperature of 55–60° C. There was obtained 28 g. (96%) of acetone in 10 hours. Distillation of the residue yielded 27.2 g. of methyl ethyl ketoxime, B.P. 78–83.6°/50 mm. The yield of methyl ethyl ketoxime was 63%.

*Example IV*

A mixture of 36.5 g. of acetoxime, 60 g. of hexanal and 1 g. toluenesulfonic acid was heated under a 4 bulb Snyder column fitted with a distillation head. Acetone was removed by distillation at a vapor temperature of 55–65° C. There was obtained 22 g. of acetone in 2½ hours. Distillation of the residue yielded 35.8 g. of hexanaldoxime, B.P. 112–114°/50 mm. This material remained a liquid at room temperature. Crystallization of the material from petroleum ether yielded a solid M.P. 47–48°. The liquid distillate was analyzed:

*Analysis.*—Calculated for $C_6H_{13}NO$: N, 12.16. Found: N, 12.58. The yield was 62%.

*Example V*

To show the effect of using a crude cyclohexanone 36.5 g. acetoxime, 64.5 g. cyclohexanone, 64.5 g. cyclohexanol and 1 g. p-toluenesulphonic acid was heated under a packed column. In one hour and two minutes 25.5 g. of acetone was removed by distillation at 55–60° C. Distillation of the residue gave 79.5 g. of material having a boiling range of 77–118° C./40 mm. and 41.5 g. cyclohexanone oxime.

*Example VI*

Into a 500 ml. Morton flask fitted with a stirrer, a 6 bulb Snyder column, a distillation head, and receiver, were introduced 43.5 g. butyraldoxime, 60 g. cyclohexanone (99.34% pure) and 50 ml. of butanol. Sufficient concentrated phosphoric acid was added to the reaction mixture to obtain a pH of 3.5. The reaction mixture was maintained at 130–133° C. over a ten hour period. During this time, 13.7 g. of distillate were obtained, which was mostly butyraldehyde. The brown residue remaining in the flask was washed with 150 ml. of water in a separatory funnel. The 55.4 g. oil layer was then distilled through an 8″ Vigreux column at 10 mm. Hg pressure to obtain cuts of distillate which comprised butanol, Butyraldoxime, cyclohexanone, and cyclohexanone oxime. The white cyclohexanone oxime (25.3 g.) was recovered at a vapor temperature of 100–103° C. This material had a melting point of 78–82.5° C. This is a yield, based on the acetoxime charged to the reaction mixture, of 21.7%.

*Example VII*

Utilizing the equipment of Example VI, 36 g. of distilled acetoxime, 60 g. of acetophenone, 60 g. of butanol and sufficient phosphoric acid were added to obtain a pH of 3.5. The reaction mixture was maintained at 123–133° C. throughout a ten hour period. During this time 20.3 g. of acetone were distilled over at a vapor temperature less than 62° C. The crude reaction mixture was transferred to a distillation flask fitted with an 8″ Vigreux column, distillation head, and receiver, and stripped at reduced pressures at a pot temperature of 91° and 2 mm. Hg. A purple brown residue (60 g.) was collected and dissolved in 180 ml. of 10% potassium hydroxide solution. This solution was extracted in a separatory funnel with two 125 ml. portions of petroleum ether. The aqueous, caustic layer was decolorized with 1% Darco G–60 char to a clear, yellow liquid. Upon the addition of an equivalent amount of hydrochloric acid, 36 g. of the free acetophenone oxime precipitated. This represents at 52.6% yield.

*Example VIII*

In many of our reactions it is necessary to use a neutral solvent for the reactants, especially where one of the reactants is not particularly soluble in the other, or where the reactants, are, for some other reason, relatively non-compatible. In one such case, 43.3 g. (0.5 mole) of butyraldoxime, 57 g. of butanol, and sufficient phosphoric acid to adjust the pH of the reaction mixture to 3.5 were charged into the apparatus of Example VI. The reaction mixture was heated to 134–143° C. and maintained at this temperature while 57 g. (0.5 mole) of n-heptaldehyde were incrementally added to the reaction mixture over a six-hour period. During this time, 26 g. of a mixture containing butyraldehyde distilled over a vapor temperature of 70–71° C. The orange oil remaining in the reaction flask was distilled through a 30″ Penn State packed column at 30 mm. Hg pressure. By this procedure, a 22% yield of n-heptaldoxime was obtained.

Now having described my invention what I claim is:

1. A process for producing higher oxime compounds from lower oxime compounds by an exchange of radicals between the oxime radical of the lower oxime compound and the carbonyl radical of a higher carbonyl compound, the steps consisting essentially of heating and reacting, in the presence of an acidic catalyst, a carbonyl compound selected from the group consisting of a ketone having at least one carbon atom alpha to the carbonyl group unsubstituted and an aldehyde with an oxime selected from the group consisting of lower aldoximes and ketoximes, removing one of the compounds from the reaction mixture and recovering the higher oxime compound.

2. A process for producing higher oxime compounds from lower oxime compounds by an exchange of radicals between the oxime radical of the lower oxime compound and the carbonyl radical of a higher carbonyl compound, the steps consisting essentially of heating to reflux and reacting, in the presence of an acidic catalyst and a solvent, a carbonyl compound having more than 3 carbon atoms selected from the group consisting of ketones having at least one carbon atom alpha to the carbonyl group unsubstituted and aldehydes with an oxime selected from the group consisting of lower aldoximes and ketoximes, distilling from the reaction mixture the lower-boiling of the reaction products, and recovering the higher oxime compound.

3. The process of claim 2 wherein the carbonyl compound is a saturated carbonyl compound and the lower oxime compound is an aldoxime.

4. The process of claim 2 wherein the lower oxime compound is acetoxime.

5. The process of claim 4 wherein the carbonyl compound is cyclohexanone.

6. The process of claim 4 wherein the carbonyl compound is methylethyl ketone.

7. The process of claim 4 wherein the carbonyl compound is hexanal.

8. The process of claim 2 wherein the carbonyl compound is acetophenone and the oxime compound is acetoxime.

9. The process of claim 2 wherein the oxime is butyraldoxime.

10. The process of claim 9 wherein the carbonyl compound is cyclohexanone.

11. The process of claim 9 wherein the carbonyl compound is heptaldehyde.

12. The process of claim 2 wherein the acidic catalyst is hydrochloric acid.

13. The process of claim 2 wherein the acidic catalyst is phosphoric acid.

14. The process of claim 2 wherein the acidic catalyst is p-toluenesulfonic acid.

15. The process of claim 2 wherein the acidic catalyst is ammonium chloride.

16. The process of claim 2 wherein the acidic catalyst is zinc chloride.

References Cited in the file of this patent

Sidgewick's Organic Chemistry of Nitrogen, pages 169–172 (1945).

Fieser et al.: "Organic Chemistry," 2nd ed., pages 168–169 (1950).